Dec. 16, 1941.                A. H. MITTAG                    2,266,714
                      ELECTRIC VALVE CONTROL CIRCUITS
                            Filed Dec. 5, 1940
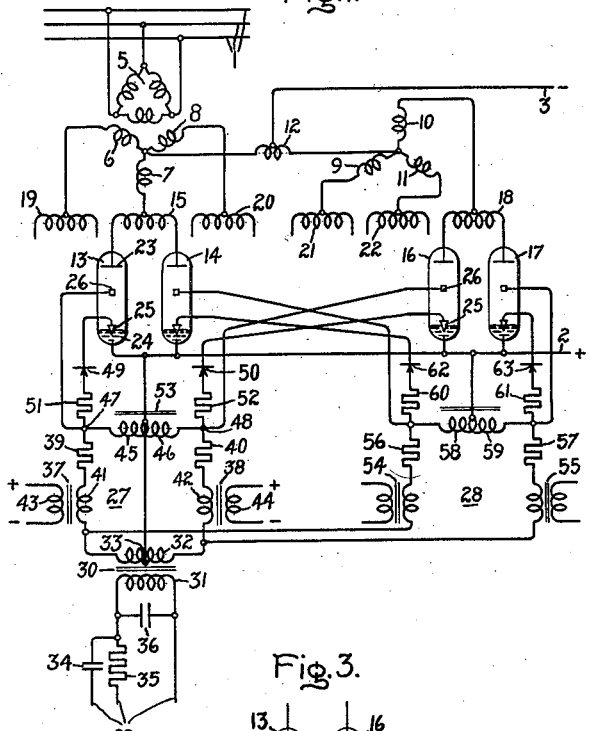
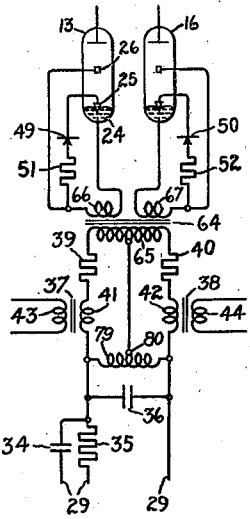
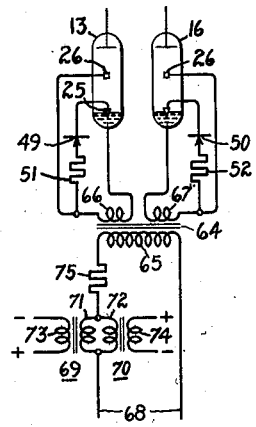
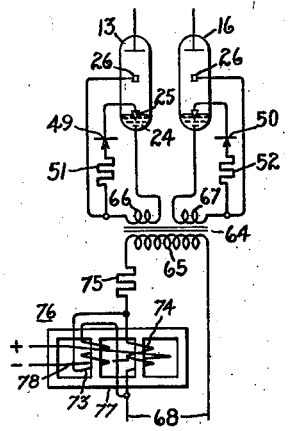
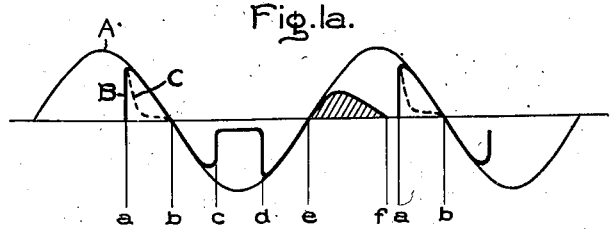
Inventor:
Albert H. Mittag,
by Harry E. Dunham
His Attorney.

Patented Dec. 16, 1941

2,266,714

UNITED STATES PATENT OFFICE 2,266,714

ELECTRIC VALVE CONTROL CIRCUITS

Albert H. Mittag, Schenectady, N. Y., assignor to General Electric Company, a corporation of New York Application December 5, 1940, Serial No. 368,671

9 Claims. (Cl. 175—363)

My invention relates to electric valve control circuits and more particularly to circuits for controlling electric valve means of the type comprising an ionizable medium and in which an immersion-ignitor control member is employed to initiate an arc discharge.

Where electric valve apparatus of the type comprising an immersion-ignitor control member is employed, it is desirable to render the electric valve means conducting by supplying to the control member an impulse of voltage of peaked wave form so that the time at which the electric valve means is rendered conducting is precisely controllable during the cycles of applied anode-cathode voltage. In accordance with the teachings of my invention described hereinafter, I provide improvements in electric control circuits of the type disclosed and claimed in my copending patent application Serial No. 333,187, filed May 3, 1940, and which is assigned to the assignee of the present application.

It is an object of my invention to provide new and improved electric valve circuits.

It is another object of my invention to provide new and improved control circuits for electric valve apparatus of the type comprising an immersion-ignitor control member.

Briefly stated, in the illustrated embodiments of my invention I provide improved excitation circuits for producing periodic voltage of peaked wave form by employing inductive devices which are saturable and wherein the circuits are arranged for application to electric translating circuits in which it is desired to render a pair of electric valve means conducting alternately or during intervals displaced 180 electrical degrees.

For a better understanding of my invention, reference may be had to the following description taken in connection with the accompanying drawing, and its scope will be pointed out in the appended claims. Fig. 1 diagrammatically illustrates an embodiment of my invention as applied to a polyphase rectifying system, and Fig. 1a represents certain operating characteristics thereof. Figs. 2, 3 and 4 represent certain modifications of the arrangement shown in Fig. 1.

Referring now to Fig. 1 of the drawing, I have illustrated my invention as applied to a polyphase rectifying system for transmitting power from an alternating current supply circuit 1 to a direct current load circuit, comprising a positive conductor 2 and a negative conductor 3, through electric translating apparatus comprising a transformer having primary windings 5 and two groups of secondary phase windings 6, 7, 8 and 9, 10, 11. The two groups of secondary windings may be connected in star or Y and may be interconnected through an interphase transformer 12 in order that the two three-phase systems operate as a double three phase Y so that each winding conducts current for 120 electrical degrees of the voltage of circuit 1, but for only 60 electrical degrees with any other winding in the other group. The electric translating apparatus also includes a plurality of electric valve means connected to the respective secondary windings. These electric valve means, where the load requirements are such as to demand a relatively heavy current, may be arranged to operate in parallel. For example, the pair of electric valve means 13 and 14 may be connected through a current dividing reactor 15 to winding 7, and a pair of electric valve means 16 and 17 may be connected to operate in parallel and may be connected to secondary winding 10 through a current dividing reactor 18. Current dividing reactors 19, 20, 21 and 22 are also associated with secondary windings in the two groups and, of course, are connected to pairs of electric valve means (not shown). These latter electric valve means have been omitted from the drawing in order to facilitate the representation of the invention. The electric valve means 13—17 are of the type comprising an ionizable medium, such as mercury vapor, which is capable of supporting an arc discharge, and each comprises an anode 23, a cathode 24, an immersion-ignitor control member 25 and a transfer or auxiliary electrode 26. The immersion-ignitor control member 25 is preferably constucted of a material such as boron-carbide or silicon-carbide having a specific electrical resistivity which is large with respect to that of the associated mercury pool cathode 24. An extremity of the control member 25 extends below the level of the mercury pool cathode, and the electric valve means is rendered conducting by the transmission of an impulse of current through the control member to the cathode of a magnitude sufficient to establish a cathode spot on the mercury pool.

I provide excitation circuits 27 and 28 which not only render predetermined electric valve means conducting alternately but also render associated pairs of electric valve means conducting simultaneously. Considering excitation circuit 27 in particular, I provide a source of alternating current 29 which in some applications may be derived from the alternating current supply circuit 1. Excitation circuit 27, for example, comprises a pair of circuits which may be energized through a transformer 30 having a primary winding 31 and a secondary winding 32 provided with terminal connections and an intermediate connection 33. If desired, a suitable phase shifting circuit comprising a capacitance 34, a resistance 35 and a capacitance 36 connected across the primary winding may be employed. This circuit is disclosed and claimed in my above-identified joint patent application. The circuits in the excitation circuit 27 comprise saturable inductive devices 37 and 38 and current limiting resistances 39 and 40 which are connected in series relation with windings 41 and 42 of the saturable devices 37 and 38, respectively. The saturable inductive devices 37 and 38 may be designed to become saturated during half cycles of voltage of both polarities of source 29. If it is desired to increase the saturation of the devices 37 and 38 during a half cycle of voltage or current of a particular polarity, saturable devices 37 and 38 may be provided with direct current control windings 43 and 44, respectively. The use of these control windings in carrying out my invention is optional. The circuits of excitation circuit 27 also include inductances 45 and 46 which are connected in series relation and which are connected in series relation with the associated current limiting resistances and inductive devices mentioned above. The inductances 45 and 46 produce across the terminals thereof periodic voltages of peaked wave form due to the saturation of inductive devices 37 and 38, and the common junctures 47 and 48 of resistances 39 and 40 and inductances 45 and 46 are connected to the control members 25 of electric valve means 13 and 16, respectively, which are rendered conducting alternately during periods displaced substantially 180 electrical degrees relative to the voltage of circuit 1. In order that the voltage impressed on the control members 25 be unidirectional, I connect suitable unidirectional conducting devices 49 and 50 in series relation with the control members 25. The common junctures 47 and 48 are also connected to the transfer or auxiliary electrodes 26 of electric valve means 13 and 16, respectively, and in order that the current be transferred to these electrodes as soon as arc discharges are established within the respective electric valve means, I employ transfer resistances 51 and 52 which are connected in series relation with the control members 25.

In order to prevent the establishment of an undesirable positive voltage across the terminals of the inductances 45 and 46 which would be caused by the decay of flux in the inductances established by the saturation of the associated inductive devices 37 or 38 during the negative or inverse half cycles of voltage of the source 29 relative to that particular circuit, I provide means, such as a core member 53, for inductively coupling the inductances 45 and 46. By this means it is assured that only a single positive impulse of voltage will appear across each of the inductances 45 and 46 during a cycle of voltage of circuit 1.

Excitation circuit 28 is similar in construction and arrangement to excitation circuit 27 and may be energized in parallel with circuit 27 across the secondary winding 32 of transformer 30. Excitation circuit 28 includes saturable inductive devices 54 and 55, current limiting resistances 56, 57, inductances 58 and 59, transfer resistances 60 and 61, and unidirectional conducting devices 62 and 63. Excitation circuit 28 provides alternating voltages of peaked wave form displaced substantially 180 electrical degrees to render electric valve means 14 and 17 conducting alternately during intervals displaced 180 electrical degrees relative to the voltage of circuit 1. Inasmuch as circuits 27 and 28 are energized in parallel relationship from the secondary winding 33 of transformer 30, pairs of electric valve means 13 and 14, and 16 and 17, are rendered conducting simultaneously, so that these pairs of electric valve means conduct current in parallel relation during the respective periods of conduction which are displaced 180 electrical degrees.

The operation of the embodiment of my invention shown in Fig. 1 will be explained by considering the system when it is supplying direct current to the load circuit from the alternating current circuit 1, which system operates as a double three-phase system so that each associated pair of electric valve means conducts current during 120 electrical degrees and conducts current in parallel relation with another pair of electric valve means associated with a secondary winding of the other group. However, each pair conducts current during only 60 electrical degrees with any other one pair of electric valve means. Considering in particular the operation of excitation circuit 27 which produces alternating voltages of peaked wave form for rendering electric valve means 13 and 16 conducting alternately during intervals of time displaced substantially 180 electrical degrees, periodic voltages of peaked wave form are produced across the terminals of inductances 45 and 46. These voltages of peaked wave form are produced during times during the cycles of voltage of source 29 at which the inductive devices 37 and 38 become saturated. The incident increase in current through the respective pairs of circuits of excitation circuit 27 causes an abrupt increase in current through each of these circuits and produces across the terminals of inductances 45 and 46 impulses of voltage which are impressed on control members 25 through resistances 51 and 52 and unidirectional conducting devices 49 and 50, respectively. Due to the use of the unidirectional conducting devices 49 and 50, only unidirectional current is supplied to the control members 25. As soon as current is transmitted to the control members 25, the passage of current through the transfer resistances 51 and 52 raises the potential of the common junctures 47 and 48 and the current is transferred from the control members 25 to the transfer or auxiliary electrodes 26 as soon as the arc discharge is established, thereby relieving the duty imposed on the control members 25 in the manner discussed particularly in my above-identified joint copending patent application.

Where the saturable inductive devices 37 and 38 are designed to become saturated during half cycles of voltage or current of both polarities derived from circuit 29, I have found that it is necessary to couple the inductances 45 and 46 in order to prevent the establishment of an undesirable impulse of voltage of peaked wave form during each cycle of voltage. Of course, it is to be appreciated that this impulse of voltage of peaked wave form is not the one above previously described and which is necessary in order to render the electric valve means conducting. This feature of my invention may be more fully appreciated by referring to the operating characteristics shown in Fig. 1a. Curve A represents the alternating voltage applied to one circuit of the excitation circuit 27, such as the left-hand circuit including inductive device 37, current limiting resistance 39 and inductance 45. It will be appreciated that the voltage applied to the right-hand circuit of excitation circuit 27 will have a phase relation displaced 180 electrical degrees relative to the electrical quantities which are discussed immediately hereinafter. If the inductances 45 and 46 are not coupled, the voltage appearing at the common juncture 47, and hence the voltage appearing across the terminals of inductance 45, will be of the nature such as that shown by heavy curve B. It will be noted that an impulse of voltage occurs during the interval a—b. This is the desirable impulse of voltage which is accurately controllable in point of time to render the electric valve means 13 conducting precisely at a certain instant during the cycle of voltage of circuit 1. During the interval b—c a negative impulse of voltage will appear across the terminals of inductance 45 due to the decay of flux, but this voltage, of course, will not be impressed on the control member 25 due to the presence of unidirectional conducting device 49. During the next succeeding half cycle, that is the negative half cycle relative to the left-hand circuit of excitation circuit 27, a negative impulse of voltage of peaked wave form will appear across inductance 45 due to the saturation of saturable inductive device 37. This impulse of voltage is represented by the portion of curve B lying within the interval d—e. During interval e—f there will appear across the terminals of inductance 45 an undesirable positive impulse of voltage which is not blocked by the unidirectional conducting device 49 and which may assume a value of sufficient magnitude to cause the electric valve means 13 to become conducting at an undesired time during the positive half cycle of anode-cathode voltage. It is this last impulse of voltage which is prevented by the coupling of inductances 45 and 46, so that the shaded portion of curve B is prevented or eliminated. As stated above, the negative portion of curve B is not impressed on the control member 25 due to the presence of the unidirectional conducting device 49 and may be disregarded. As a result, only one voltage of peaked wave form, that lying within the interval a—b, is present. It will be appreciated that due to the establishment of a cathode spot, the voltage impressed on the control member 25 may assume the shape represented by dotted curve C, the transfer electrode effecting a reduction in the voltage and current supplied to the control member 25 as soon as an arc discharge is established.

Fig. 2 diagrammatically illustrates another modification of my invention employing an excitation circuit similar in many respects to that shown in Fig. 1, and corresponding elements have been assigned like reference numerals. In Fig. 2 only the electric valves 13 and 16, which are rendered conducting alternately, are shown. The excitation circuit comprises two circuits, including saturable inductive devices 37 and 38 which energize an inductance or an inductive means such as a transformer 64 having a primary winding 65 connected to the two circuits of the excitation circuit and which also includes two secondary windings 66 and 67, which may or may not be electrically insulated, and which are connected to electric valve means 13 and 16, respectively. An auto-transformer 68 is connected to provide an intermediate connection 69 for energizing both of the circuits in the excitation circuit.

The primary winding 65 of transformer 64 serves to prevent the generation or induction of undesirable impulses of positive voltage in the excitation circuit. In other words, it serves a purpose similar to the coupling of inductances 45 and 46 in the arrangement of Fig. 1.

The excitation circuit shown in Fig. 2 operates to produce periodic voltages of peaked wave form and by virtue of the transformer 64 only one positive impulse of voltage is impressed on the control member 25 of each of the valves 13 and 16 during one complete cycle of its applied anode-cathode voltage.

Fig. 3 diagrammatically illustrates a further embodiment of my invention in which the electric valves 13 and 16 are rendered conducting alternately. It will be understood that these electric valves are also connected in a system, such as that shown in Fig. 1, in which it is desired to render the electric valves conducting alternately during intervals of time displaced substantially 180 electrical degrees. A source of alternating current 68 is connected to the primary winding 65 of transformer 64 through a pair of saturable inductive devices 69 and 70 having main windings 71 and 72 connected in parallel and having control or biasing windings 73 and 74, respectively. A resistance 75 is connected in series relation with the windings 71 and 72 and primary winding 65 of transformer 64.

Saturable inductive devices 69 and 70 are arranged so that one is saturated during positive half cycles of the voltage of source 68 and the other is arranged to become saturated during negative half cycles of the voltage of this source. By virtue of the operation of the saturable inductive devices 69 and 70, alternating voltages of peaked wave form are induced in secondary windings 66 and 67 of transformer 64.

By employing the modification of my invention shown in Fig. 3, it is possible to simplify the excitation circuits for energizing a pair of electric valves which are intended to operate during intervals displaced 180 electrical degrees. The interconnection of the saturable devices 69 and 70 through the primary winding 65 serves to permit the generation of undesired positive impulses of voltage at times during the cycle of voltage of the source 68 when such an impulse is neither necessary nor desirable.

In Fig. 4 there is diagrammatically illustrated a still further embodiment of my invention which is a modification of the arrangement shown in Fig. 3. Instead of employing two separate saturable inductive devices, this aspect of my invention may be carried out by employing a saturable inductive device 76 comprising a core structure 77 having four legs; the windings 73 and 74 are wound around different legs of the core and correspond to the windings of the same numerals in Fig. 3. Where the windings 73 and 74 are wound in the same direction around the respective associated legs, the windings should be connected in the manner illustrated in order that an alternating voltage of peaked wave form be produced, that is, in order that a voltage of peaked wave form be produced during half cycles of voltage of both polarities derived from source 68. The device 76 also comprises means for producing a unidirectional magnetomotive force therein, such as a biasing winding 78, which is wound around both of the middle legs of the core and which is inductively associated with both windings 73 and 74.

The embodiment of my invention diagrammatically illustrated in Fig. 4 operates in substantially the same manner as that explained above in connection with Fig. 3. The windings 73 and 74 of the device 76 are arranged so that one of the windings saturates during the positive half cycles of voltage of source 68, and the other is arranged to saturate during the negative half cycles of the voltage of this source. As a result, alternating voltages of peaked wave form are induced in the secondary windings 66 and 67. Undesirable positive peaks are also eliminated due to the connection of the primary winding 65 to both windings 73 and 74.

Certain features of the circuit arrangements shown in Figs. 3 and 4 are broadly disclosed and claimed in a copending patent application Serial No. 368,669 of Martin A. Edwards, filed concurrently herewith, and which is assigned to the assignee of this application.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a direct current circuit, electric translating apparatus connected between said circuits and comprising a plurality of phase windings and a plurality of pairs of associated electric valve means and means for connecting the electric valve means so that the pairs associated with any one phase winding conduct current simultaneously, said electric valve means each having an immersion-ignitor control member and employing an ionizable medium capable of supporting an arc discharge, a source of alternating current, and a plurality of excitation circuits energized from said source for rendering predetermined pairs of electric valve means connected to different phase windings conductive during intervals displaced one hundred eighty electrical degrees with respect to the voltage of said alternating current circuit and each including a pair of circuits for producing periodic voltages of peaked wave form displaced one hundred eighty electrical degrees and each including in series relation a saturable inductive device, a current limiting resistance and an inductance across which appears a voltage of peaked wave form due to the saturation of the associated inductive device and means for coupling the inductances in the pairs of circuits to prevent the production of positive voltages thereacross which would be caused due to the decay of flux established in said inductances when the associated inductive device is saturated during the negative or inverse half cycles of voltage of said source.

2. In combination, an alternating current circuit, a load circuit, electric translating apparatus connected between said circuits and comprising a pair of electric valve means each comprising an anode, a cathode and an immersion-ignitor control member, a source of alternating current, and an excitation circuit energized from said source for rendering said pair of electric valve means conducting alternately and including a pair of circuits for producing periodic voltages of peaked wave form displaced one hundred eighty electrical degrees and each including in series relation a saturable inductive device, a current limiting resistance and an inductance across which appears a voltage of peaked wave form caused by the saturation of the associated inductive device, and means for coupling the inductances electromagnetically in said pair of circuits in order to prevent the establishment of a positive voltage thereacross which would be caused by the decay of flux in said inductance established by the saturation of the associated inductive device during the negative or inverse half cycle of voltage of said source.

3. In combination, an alternating current circuit, a direct current circuit, electric translating apparatus connected between said circuits and comprising a pair of electric valve means each including an anode, a cathode and an immersion-ignitor control member, an excitation circuit energized from said source for rendering said pair of electric valve means conducting alternately and including a transformer having a secondary winding, a pair of circuits energized from said secondary winding and each including in series relation a saturable inductive device, a current limiting resistance and an inductance across which appears a voltage of peaked wave form due to the saturation of said inductive device, and means for coupling the inductances electromagnetically in each of the pair of circuits in order to prevent the production of positive voltages thereacross which would be caused due to the decay of flux established in said inductances when the associated inductive device is saturated during the negative or inverse half cycle of voltage of said source.

4. In combination, an alternating current circuit, a load circuit, electric translating apparatus connected between said circuits and comprising a plurality of electric valve means each having an anode, a cathode, an immersion-ignitor type control member and an auxiliary electrode, and an excitation circuit for energizing said control members to cause said electric valve means to conduct current in a predetermined order, certain pairs of which conduct current during intervals displaced substantially one hundred eighty electrical degrees relative to the voltage of said alternating current circuit and comprising a source of alternating current, means for energizing the control members of said pair of electric valve means comprising a transformer having a secondary winding, means connected to said secondary winding including a pair of saturable inductive devices, means for connecting said excitation circuit to the control members of said pair of electric valve means, means for connecting said excitation circuit to the auxiliary electrodes of said pair of electric valve means and a pair of inductively coupled windings connected between the auxiliary electrodes to prevent the production of positive voltage in the respective circuits due to the saturation of the associated inductive devices during the negative or inverse half cycle of voltage of said source.

5. In combination, an alternating current circuit, a load circuit, electric translating apparatus connected between said circuits and comprising a pair of electric valve means each having an anode, a cathode and an immersion-ignitor control member, a source of alternating current, and an excitation circuit energized from said source for rendering said pair of electric valve means conducting alternately and including a pair of circuits for producing periodic voltages of peaked wave form displaced one hundred eighty electrical degrees and each including in series relation a saturable inductive device, a current limiting resistance, a transformer having a primary winding connected to said pair of circuits and including a pair of secondary windings, means for connecting one of said secondary windings to the control member of one of said pair of electric valve means and means for connecting the other secondary winding to the control member of the other electric valve means, said primary winding serving to prevent the induction of positive voltages in the respective secondary windings which would be caused by the decay of flux in the primary winding established by the saturation of the associated inductive devices during the negative or inverse half cycles of voltage of said source.

6. In combination, an alternating current circuit, a load circuit, electric translating apparatus connected between said circuits and comprising a pair of electric valve means each having an anode, a cathode and an immersion-ignitor control member, a source of alternating current, and an excitation circuit energized from said source for rendering said pair of electric valve means conducting alternately and including a pair of circuits for producing periodic voltages of peaked wave form displaced one hundred eighty electrical degrees and each including in series relation a saturable inductive device, a current limiting resistance, a transformer having a primary winding connected to said pair of circuits and including a pair of secondary windings, means including a unidirectional conducting device for connecting one of said secondary windings to the control member of one of said electric valve means and means including a second unidirectional conducting device for connecting the other control winding to the control member of the other electric valve means, said primary winding serving to prevent the induction of positive peaks of voltage in said secondary windings which would be caused by the decay of flux in said primary winding due to the saturation of the associated inductive devices during the negative or inverse half cycles of voltage of said source.

7. In combination, an alternating current circuit, a direct current circuit, electric translating apparatus connected between said circuits and comprising a plurality of phase windings and a plurality of pairs of associated electric valve means and means for connecting the electric valve means so that the pairs associated with any one phase winding conduct current simultaneously, said electric valve means each having an immersion-ignitor control member and employing an ionizable medium capable of supporting an arc discharge, a source of alternating current, and a plurality of excitation circuits energized from said source for rendering predetermined pairs of electric valve means connected to different phase windings conductive alternately and including a transformer connected to said source and having a secondary winding provided, a pair of circuits for producing periodic voltages of peaked wave form displaced one hundred eighty electrical degrees and each including in series relation a saturable inductive device, a current limiting resistance, an auto-transformer having a winding connected to said pair of circuits, means for interconnecting said auto-transformer with the winding of the first mentioned transformer, means including a unidirectional conducting device for connecting said auto-transformer to the control member of one of said electric valve means and means including a second unidirectional conductive device for connecting the auto-transformer to the control member of the other electric valve means, said auto-transformer serving to prevent the conduction of positive peaks of voltage thereacross which would be caused by the decay of flux in said auto-transformer due to the saturation of the inductive devices during the negative or inverse half cycles of voltage of said source applied to the respective pairs of circuits.

8. In combination, an alternating current circuit, a direct current circuit, electric translating apparatus connected between said circuits and comprising a pair of electric valve means each having an immersion-ignitor control member, a source of alternating current, an excitation circuit energized from said source and including means for producing periodic voltages of peaked wave form displaced one hundred eighty electrical degrees and including a pair of saturable inductive devices each having a core member, a main winding and a biasing winding, the main windings being connected directly in parallel, a resistance and means constituting an inductance connected in series relation with said main windings, and means comprising unidirectional conducting devices for connecting the immersion-ignitor control members to the last-mentioned means.

9. In combination, an alternating current circuit, a direct current circuit, electric translating apparatus connected between said circuits and comprising a pair of electric valve means each having an immersion-ignitor control member, a source of alternating current, an excitation circuit energized from said source for rendering said pair of electric valve means conducting alternately and including means for producing periodic voltages of peaked wave form displaced one hundred eighty electrical degrees and including a saturable inductive device comprising a magnetic core member provided with a plurality of legs, a pair of main windings each associated with a different leg and means for establishing a unidirectional magnetomotive force in said core member, the main windings being connected in parallel, a serially connected resistance and means constituting an inductance connected in series relation with said main windings, and means comprising unidirectional conducting devices for connecting the control members to the last mentioned means.

ALBERT H. MITTAG.